US007483897B2

(12) United States Patent
Hardcastle

(10) Patent No.: US 7,483,897 B2
(45) Date of Patent: Jan. 27, 2009

(54) SYSTEM AND METHOD FOR HARVESTING OF DATA FROM PERIPHERAL DEVICES

(75) Inventor: Michael J. Hardcastle, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1391 days.

(21) Appl. No.: 10/308,761

(22) Filed: Dec. 3, 2002

(65) Prior Publication Data

US 2004/0107188 A1    Jun. 3, 2004

(51) Int. Cl.
*G06F 7/00* (2006.01)
*G06F 17/30* (2006.01)
*G06F 15/16* (2006.01)
*G06F 15/173* (2006.01)
*G06F 3/00* (2006.01)
*G06F 5/00* (2006.01)

(52) U.S. Cl. .................. 707/10; 709/217; 709/218; 709/219; 709/223; 709/224; 710/15; 710/16; 710/17; 710/18; 710/19; 710/44; 710/45; 710/46; 710/47

(58) Field of Classification Search .................. 707/10; 709/217–219, 223, 224; 710/15–19, 44–47
See application file for complete search history.

(56) References Cited

U.S. PATENT DOCUMENTS

| 4,260,062 | A | * | 4/1981 | Lockett .................. 209/582 |
| 5,493,694 | A | * | 2/1996 | Vlcek et al. .............. 455/521 |
| 5,961,613 | A | * | 10/1999 | DeNicola ................. 710/18 |
| 6,449,663 | B1 | * | 9/2002 | Carney et al. ............ 710/15 |

FOREIGN PATENT DOCUMENTS

JP    0964336 B1 *  1/2003

OTHER PUBLICATIONS

IBM Technical Disclosure Bulletin (ITDB), 'Limited Tolerance to Poll Response Delays', Jan. 1, 1992, vol. 34, No. 8, pp. 278-279.*
U.S. Appl. No. 10/308,784, filed Jun. 3, 2004, Hardcastle et al.

* cited by examiner

*Primary Examiner*—James Trujillo
*Assistant Examiner*—Cheryl M Shechtman

(57) ABSTRACT

A system and method harvest data from at least one device, by canvassing the devices and tracking which canvassed devices yielded harvested data and then repeating such canvassing and tracking until either data has been obtained from all of the devices, or a certain time has passed since the beginning of the canvassing period. In a further embodiment, when data has been obtained from all the devices or the time has passed, whichever comes first, the harvested data is sent to a central processing center.

13 Claims, 2 Drawing Sheets

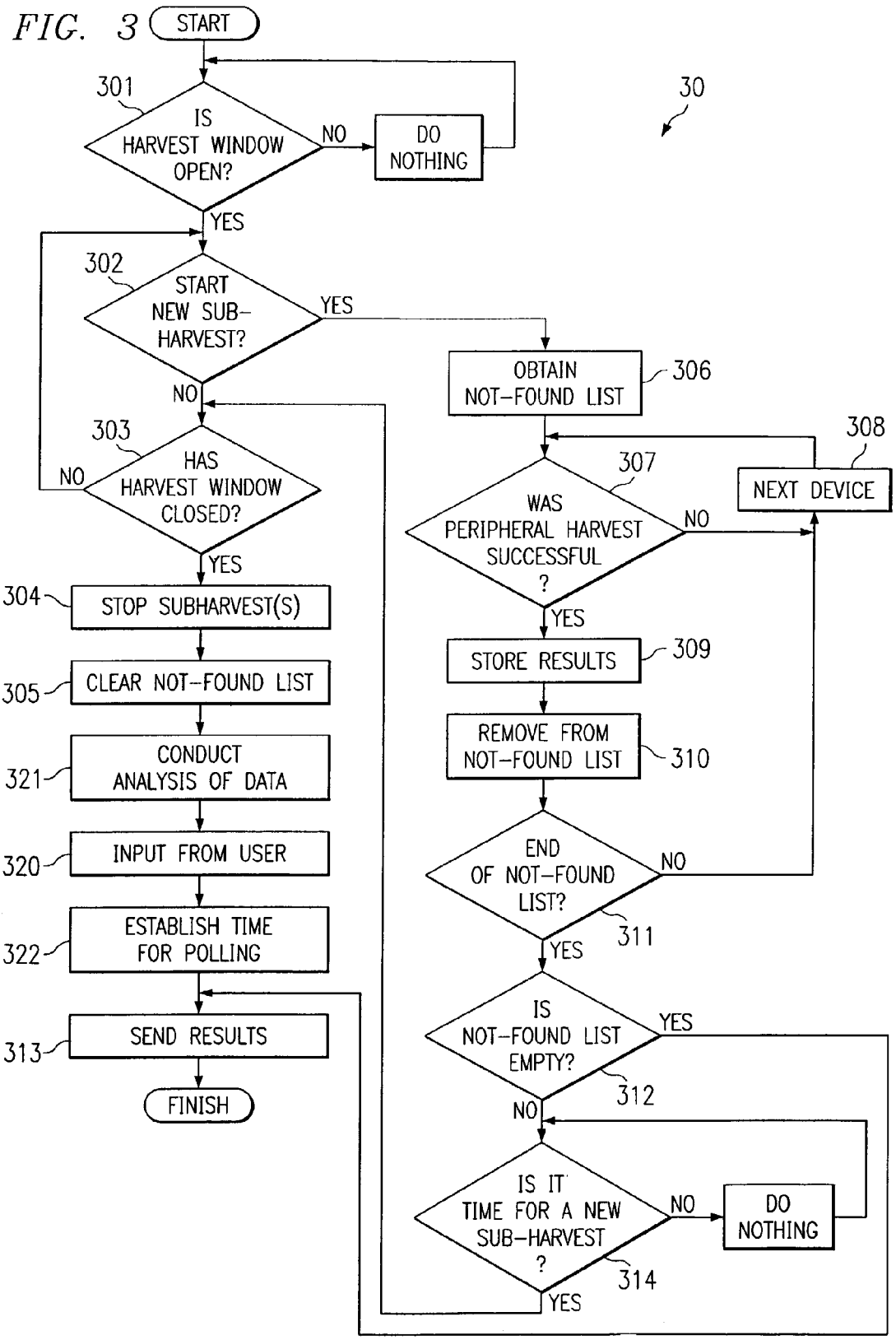

SYSTEM AND METHOD FOR HARVESTING OF DATA FROM PERIPHERAL DEVICES

CROSS-REFERENCE TO RELATED APPLICATIONS

The present application is related to commonly-assigned U.S. Published Patent Application Number 2004/0107275, published Jun. 3, 2004 entitled "SYSTEM AND METHOD FOR THE HYBRID HARVESTING OF INFORMATION FROM PERIPHERAL DEVICES", the disclosure of which is hereby incorporated by reference herein.

FIELD OF THE INVENTION

This invention relates to the harvesting of data from remote devices and more particularly to a system and method for the efficient harvesting of such data using windows of opportunity.

DESCRIPTION OF RELATED ART

It has become common practice to electronically retrieve, or harvest, parametric information, for example, the amount of consumables, such as ink and paper from a printer, page counts, media types and usage, error conditions, current state, and the like from peripheral devices. These peripherals can be, for example, printers, plotters, scanners and the like.

The above-identified co-pending patent application is one example of a data harvesting system and method. Such systems and methods require that the peripheral device is turned on and on-line at the time the data harvesting is to occur. In many situations, the peripheral is off-line, meaning that external communication can not be achieved at that point of time. Sometimes the peripheral is simply turned off. It therefore follows that when the peripheral is not available for the harvesting of data, the effectiveness of the harvesting system is impaired.

For example, assume that one of the purposes of the data harvesting system is to monitor the ink and/or paper usage of a group of printers and to then provide additional ink, and/or other supplies for use at the various printers when required. Also assume that when the data harvesting occurs, one or more of the printers is off-line, unpowered, or otherwise unavailable. In such a situation, the ability to timely replenish the necessary supplies is diminished.

BRIEF SUMMARY OF THE INVENTION

In one embodiment there is disclosed a system and method for harvesting data from a plurality of devices, by canvassing said plurality of devices and tracking which canvassed devices yielded harvested data and then repeating such canvassing and tracking until either data has been obtained from all of the plurality of devices, or a certain time has passed since the beginning of the canvassing period. In a further embodiment, when data has been obtained from all the devices or the time has passed, whichever comes first, the harvested data is sent to a central processing center.

BRIEF DESCRIPTION OF THE DRAWINGS

FIG. 3 is a flow chart showing the method of operation of one embodiment of the invention.

DETAILED DESCRIPTION

Figure 1:
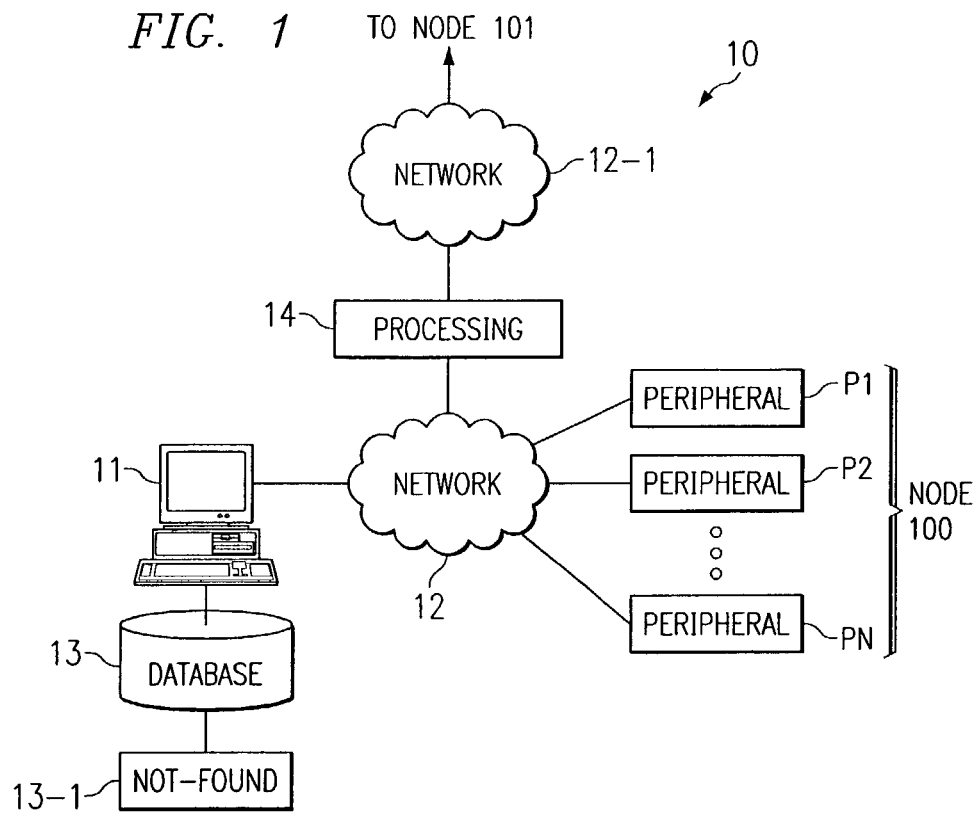
FIG. 1 shows one embodiment of a system using the incentive concepts.

Turning now to FIG. 1, there is shown system 10 in which processor 11 is shown in conjunction with database 13 adapted for harvesting data from a plurality of peripheral devices P1-PN via network 12. The harvested information from peripherals P1-PN is stored, in one embodiment, temporarily in database 13 and then communicated under control of processor 11 to processing center 14 at a location remote from the peripheral devices.

Note that using the system and method of this invention, processor 11 may gather data from one peripheral P1 or from a group of peripherals, with the gathered data being stored in database 13 for a period of time. This system could be established such that several groups or nodes, such as node 100, of peripherals can have data harvested therefrom with the data being stored in database 13. Then, at some period of time, such as when it is convenient for a user or at a scheduled time, the harvested data is transmitted from database 13 via network 12 to processing location 14. Processing location 14 can be, for example, a system which keeps track of the consumables, such as ink and paper use in printing or other peripheral devices, so that a central location can re-supply the consumables to each device as necessary. This allows for the proper operation and maintenance of peripheral devices P1-P11 from a location remote therefrom. As shown, processing location 14 can, if desired, receive data from several nodes, for example, from node 101 via network 12-1. Of course, it would be understood that network 12-1 and network 12 could be one in the same or could be separate networks if desired.

Figure 2:
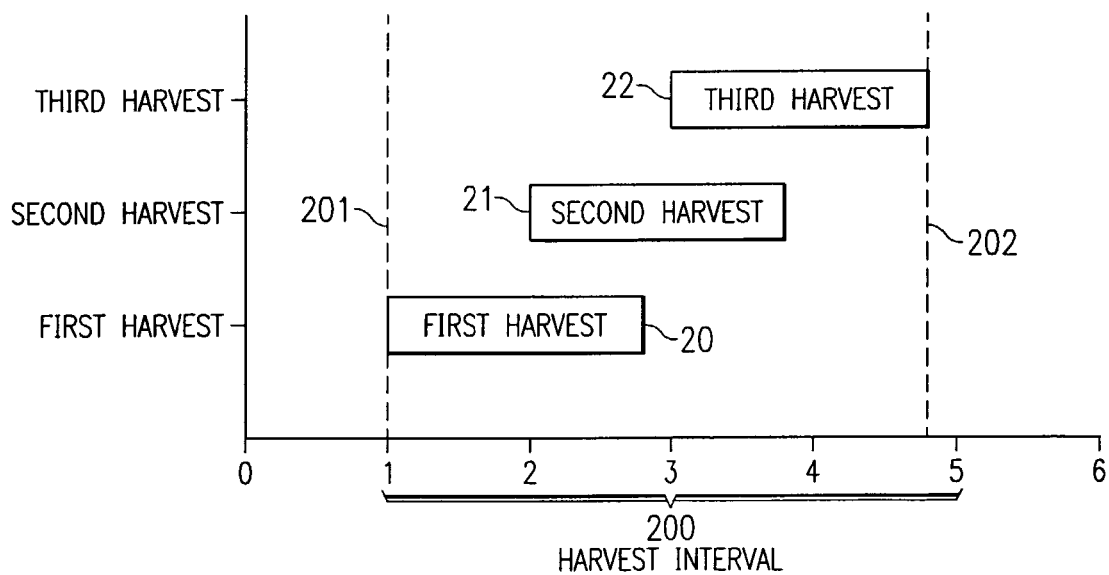
FIG. 2 show several sub-harvest times within a interval.

Turning now to FIG. 2, there is shown one harvest interval 200 which could occur once a day, twice a day, or as often as the system administrator decides. In operation, once the harvest interval time opens, the system attempts to harvest data from all or some portion of the peripheral devices that are in the group of devices to be harvested at that time. This is accomplished during the first sub-harvest interval 20. The data that is harvested is stored in database 13, as discussed above. Any peripheral device P1-PN at node 100 that does not respond to the request for data is annotated or stored in database 13-1. Database 13-1 is the "not found" database, meaning that the identity of the peripheral devices stored therein are devices from which data has not been harvested at this harvest interval.

At some period of time after the beginning of the first sub-harvest interval, a second sub-harvest interval 21 begins. Second sub-harvest interval 21 can overlap first sub-harvest interval 20, as shown in FIG. 2, or could begin after the end of first sub-harvest interval 20. In a preferred embodiment, the sub-harvest intervals 20, 21, 22, begin one hour apart. However, for different situations this spacing can be changed and, in fact, the different subintervals can be variably spaced such that the second harvest interval 21, for example, could start one hour after the first harvest interval 20 started, while the third sub-harvest interval 22 could start four hours after the first sub-harvest interval 20 started. These numbers are arbitrary and designed to maximize the potential for obtaining data from as many of the devices as possible during each harvest interval 200. Of course, it should be noted that while three sub-intervals are shown, any number of sub-intervals could be utilized for a particular harvest interval 200. The purpose being that the peripheral devices are turned off at some times and, thus are unavailable for the harvesting of data. The harvest interval itself is selected so as to maximize the likelihood that a maximum number of peripheral devices within the node are on at the time of the data harvesting.

Continuing in FIG. 2, at the time set for the beginning of the second sub-harvest of data from node 100 the system would determine from "not found" database 13-1 the identity of the peripherals that have not been available in prior harvesting subintervals. These previously "not found" peripherals would then be targeted for the harvesting of data. Again, during the second sub-harvest interval, information that is harvested is stored in database 13. The identity of any peripheral that responds in the second sub-interval is removed from database 13-1. This procedure is repeated for the third and any subsequent sub-harvest subintervals, until either there are no peripheral device identifiers remaining in "not found" memory 13-1 or the end of harvest interval 200 has occurred, whichever comes first. At that point, database 13, under control of processor 11, sends the information that has been harvested from peripheral devices P1-PN through network 12 to processing system 14 such that the harvested information can be processed as desired.

Turning now to FIG. 3, there is shown flowchart 30 which illustrates one embodiment of the invention. Process 301 determines if a harvest window (i.e. time for polling peripheral devices) is open. This would be the beginning of harvest interval 200, shown in FIG. 2. If it is not time, then nothing is done and the system continues to wait until it is time for the beginning of harvest interval 200 under control of process 301. When it is time for the start of harvest interval 200, process 302 starts a new sub-harvest by obtaining the not-found list via process 306 in conjunction with database 13-1. This could be a list of all the peripherals at node 100 that are to be polled at this period of time, which may be transferred to the not-found list at the beginning of each sub-harvest. This list could change based upon statistics, or based upon an operator-established number, or can be constant so that all peripherals in the node are harvested during each harvest interval.

Process 307 determines whether or not a particular peripheral has responded successfully. If it has not responded, the next peripheral identity is obtained from the not-found list via process 308. If the peripheral does respond, via process 307, then the results are stored via process 309 in database 13, and the identity of the peripheral is removed from the not-found list via process 310. Process 311 determines if a complete pass has been made through the not-found list. If a complete pass has been made, then process 312 determines if the polling, or canvassing, is finished, which means that all of the peripherals have responded for this node and that no peripheral identifications remain in "not found" memory 13-1. If a complete pass has not been made (process 311) then the next peripheral information is obtained, via processes 308 and the system continues. If polling, or canvassing, is finished, via process 312, then the results that have been stored in database 13 are sent to remote processing location 14, as discussed above, via process 313.

In most situations, there will be at least one peripheral device which was not available during first subinterval 20 as determined by process 312. In such a situation, the identity of such devices would remain in the not-found list. Process 314 (optional) determines if a certain time has elapsed since the previous polling. If that has not occurred, then nothing is done at this point and the system continues to wait for the proper time lapse. When it is time for a new sub-harvest, via process 314, then second sub-harvest interval 21, as shown in FIG. 2, begins via processes 303 and 302 and the system obtains the peripheral information from "not found" list 13-1 via process 306 as discussed above. The peripherals identified within that database are then polled and processes 307, 308, 309, 310, 311, 312, 314, 303 and 302 repeat as many times as are necessary until all of the peripherals identified in "not found" memory 13-1 have been polled during the second sub-harvest interval, or until process 303 determines that the harvest interval is closed.

When process 303 determines that the harvest window is closed, process 304 stops the sub-harvest and process 305 clears "not found" memory 13-1. At that point, the information in database 13 is available to be sent to processing location 14 via process 313.

Process 322 can establish the time for polling based upon user input 320 or based upon an analyst of data which has been obtained from database 13 over a period of time via process 321. This could be a statistical analysis to determine which times are most profitable for the obtaining of data and how many iterations are necessary and how long apart should they be spaced. For example, it could be determined that during weekdays certain times are optimal for harvesting and that during weekends different times should be utilized. If this were the case, then the internal harvest start times would be adjusted as would the harvest subintervals to take into account the best times and intervals to be utilized.

What is claimed is:

1. A method for gathering consumable data from at least one device, said device having time constraints around which said consumable data can be gathered, said method comprising:
   establishing a periodic time window for gathering said data, said time window optimized around the time constraints of each of said devices;
   establishing within said time window a plurality of sub-time windows;
   attempting, during a first one of said sub-time windows, to gather data from all of said devices; and
   attempting, during each subsequent sub-time window of a periodic time window, to gather data from all devices that were not available during prior sub-time windows of said periodic time window.

2. The method of claim 1 further including:
   establishing, prior to a first data gathering, a window of opportunity during which it is anticipated the at least one device will be available for such data gathering; said window of opportunity coinciding with said first one of said sub-time windows.

3. The method of claim 2 wherein said window of opportunity is established based in part upon statistical information generated pertaining to availability of said devices.

4. The method of claim 3 wherein said devices are printers.

5. The method of claim 1 wherein said devices are printers.

6. The method of claim 1 wherein said periodic time window is established to fall within a time of high probability of the availability of said devices to have data to be gathered therefrom.

7. The method of claim 6 wherein said periodic time window is derived, at least in part, by one of the following:
   manual setting of start times, automatic setting of start times based on statistical analysis of past availability times, combination of start times and statistically based calculated times.

8. The method of claim 6 wherein the sub-time windows within said periodic time window are adjustable.

9. The method of claim 8 wherein said periodic time window is adjustable.

10. The system method of claim 1 wherein the sub-time windows within said periodic time window are fixed periods.

11. The system of claim 10 wherein said periodic time window is adjustable.

12. The method of claim 1 further comprising:
transmitting said gathered data to a processing center remote from said devices when data has been gathered from all of said at least one device.

13. The method of claim 1 further comprising:
transmitting said gathered data to a processing center remote from said device at the expiration of all of said sub-time windows of a given time window.

* * * * *

UNITED STATES PATENT AND TRADEMARK OFFICE
CERTIFICATE OF CORRECTION

PATENT NO. : 7,483,897 B2  Page 1 of 1
APPLICATION NO. : 10/308761
DATED : January 27, 2009
INVENTOR(S) : Michael J. Hardcastle It is certified that error appears in the above-identified patent and that said Letters Patent is hereby corrected as shown below:

In column 4, line 66, in Claim 10, delete "system" before "method".

Signed and Sealed this

Nineteenth Day of May, 2009

JOHN DOLL
*Acting Director of the United States Patent and Trademark Office*